United States Patent [19]

Watanabe

[11] Patent Number: 4,625,218

[45] Date of Patent: Nov. 25, 1986

[54] DRIVE MECHANISM FOR THERMAL TRANSFER TYPE LINE RECORDER

[75] Inventor: Tetsuo Watanabe, Tokyo, Japan

[73] Assignee: Ricoh Company, Ltd., Tokyo, Japan

[21] Appl. No.: 791,066

[22] Filed: Oct. 24, 1985

[30] Foreign Application Priority Data

Oct. 29, 1984 [JP] Japan .................................. 59-227324

[51] Int. Cl.$^4$ ........................................... G01D 15/10
[52] U.S. Cl. ................................ 346/76 PH; 346/106;
346/136; 400/120; 400/273; 400/240.3
[58] Field of Search .................. 346/76 PH, 105, 106,
346/136; 400/120, 273, 240.3, 224.2

[56] References Cited

U.S. PATENT DOCUMENTS 4,492,965 1/1985 Ohnishi et al. .................. 346/76 PH
4,531,132 7/1985 Wilkinson ...................... 346/76 PH Primary Examiner—A. Evans
Attorney, Agent, or Firm—Oblon, Fisher, Spivak, McClelland & Maier

[57] ABSTRACT

A drive mechanism for a thermal transfer type line recording apparatus is implemented with only two drive motors in driving three essential members of the recorder i.e., platen, ink sheet, and thermal head. While a first drive motor is exclusively assigned to the platen, a second drive motor is shared by the ink sheet, which is fed in one direction only, and the thermal head, which is released from the platen without any intermediary actions concerning the sequence. The second drive motor feeds the ink sheet while in rotation in one direction and drives the thermal head while in rotation in the other direction, each through a one-way clutch.

10 Claims, 5 Drawing Figures

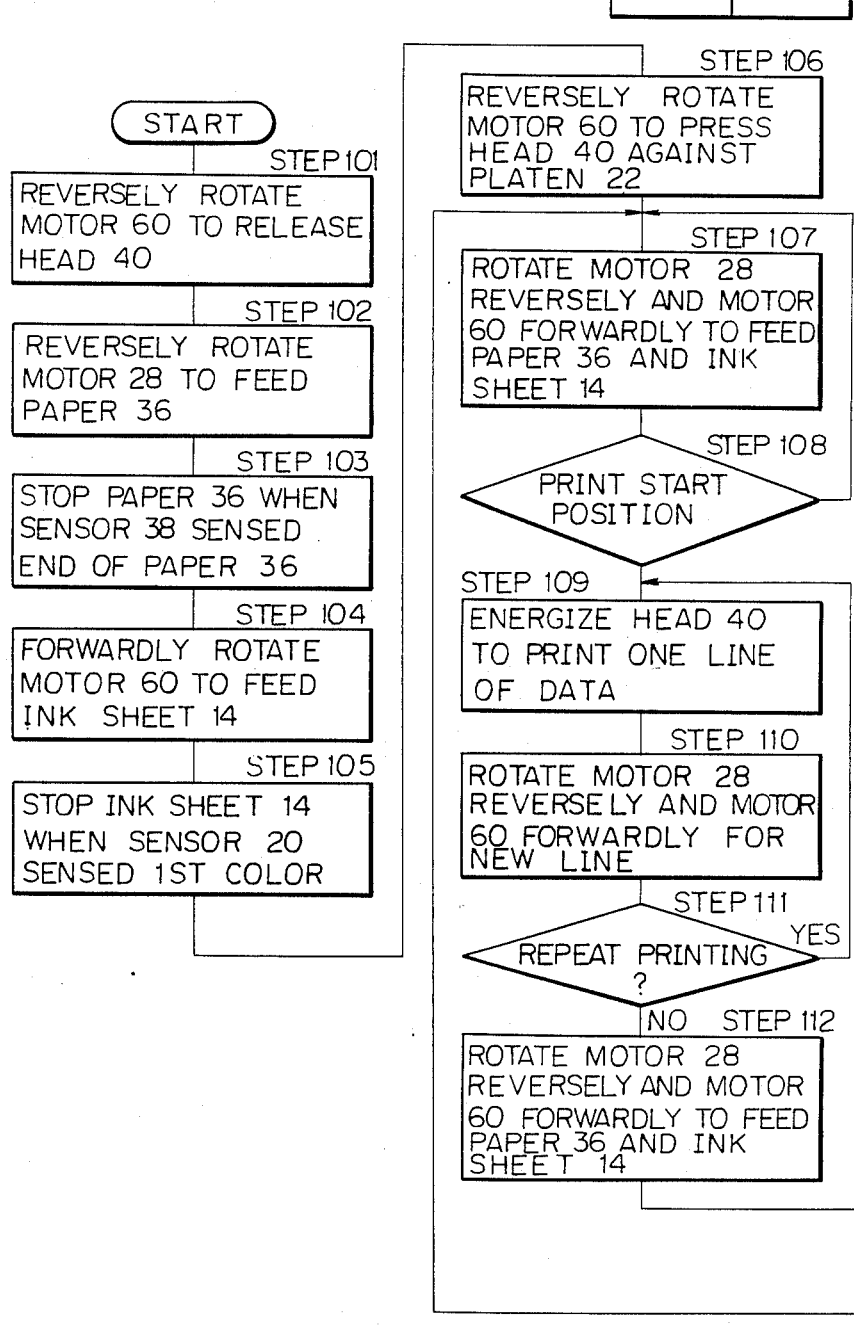

DRIVE MECHANISM FOR THERMAL TRANSFER TYPE LINE RECORDER

BACKGROUND OF THE INVENTION

The present invention relates to a thermal transfer type line recording apparatus such as a thermal transfer type line printer, copier and facsimile terminal and, more particularly, to a drive mechanism for driving a platen, ink sheet and thermal head which are installed in such a line recorder.

A recorder of the type described generally includes a platen and a thermal head which is movable into and out of contact with the platen. A paper serving as a recording medium and an ink sheet are laid one upon the other and passed together between the platen and the thermal head. The thermal head records one line of data at a time on the paper in pressing contact with the platen and repeats the recording operation while the platen is rotated.

A prior art drive mechanism built in such a recorder comprises three exclusive motors which are associated with the platen, ink sheet and thermal head, respectively. The use of three motors, among others, is the factor which has obstructed the cut-down in cost and size of the above-stated kind of recorder.

SUMMARY OF THE INVENTION

It is therefore an object of the present invention to provide a drive mechanism for a thermal transfer type line recorder which can be implemented with a smaller number of drive motors than the prior art mechanism and, thereby, attains a more cost-effective and small-size construction.

It is another object of the present invention to provide a generally improved drive mechanism for a thermal transfer type line recorder.

A drive mechanism of the present invention is applicable to a thermal transfer type line recording apparatus having a platen over which a paper and an ink sheet superposed on each other are passed, and a thermal head movable into contact with the platen to press the superposed paper and ink sheet against the platen to record data on the paper one line at a time by thermal transfer. The platen is indexable to repeat the data recording operation. The drive mechanism comprises a first drive motor for driving the platen in a rotational motion, a second drive motor, and a device for feeding the ink sheet responsive to rotation of the second drive motor which occurs in one direction and driving the thermal head responsive to rotation of the second drive motor which occurs in the other direction.

In accordance with the present invention, a drive mechanism for a thermal transfer type line recording apparatus is implemented with only two drive motors in driving three essential members of the recorder, i.e. platen, ink sheet, and thermal head. While a first drive motor is exclusively assigned to the platen, a second drive motor is shared by the ink sheet, which is fed in one direction only, and the thermal head, which is released from the platen without any intermediary actions concerning the sequence. The second drive motor feeds the ink sheet while in rotation in one direction and drives the thermal head while in rotation in the other direction, each through a one-way clutch.

The above and other objects, features and advantages of the present invention will become more apparent from the following detailed description taken with the accompanying drawings.

DESCRIPTION OF THE PREFERRED EMBODIMENT

While the drive mechanism for a thermal transfer type line recorder of the present invention is susceptible of numerous physical embodiments, depending upon the environment and requirements of use, a substantial number of the herein shown and described embodiment have been made, tested and used, and all have performed in an eminently satisfactory manner.

Figure 1:
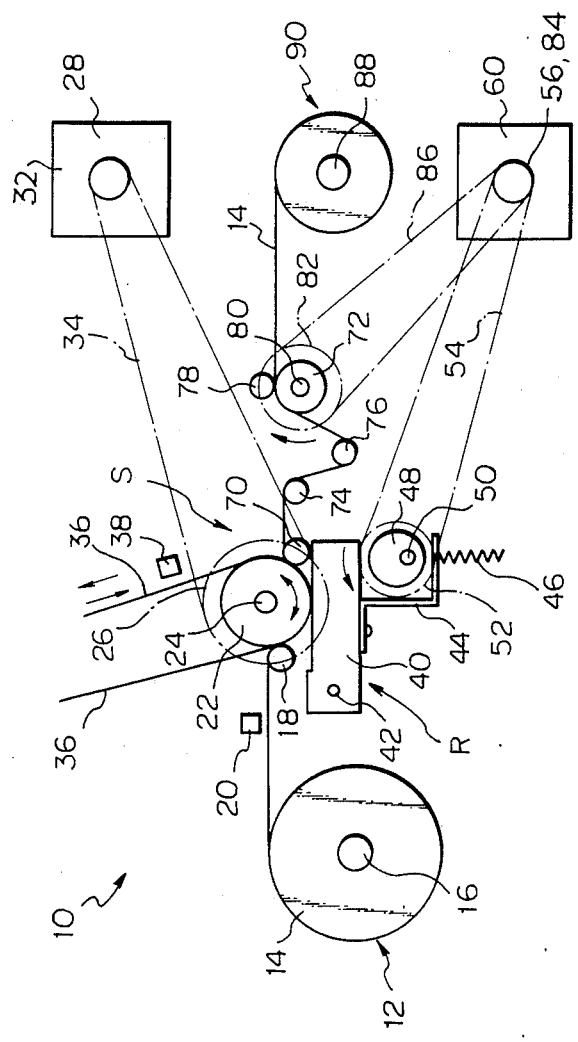
FIG. 1 is a schematic view of a thermal transfer type line recorder to which a drive mechanism embodying the present invention is applied.
Figure 2:
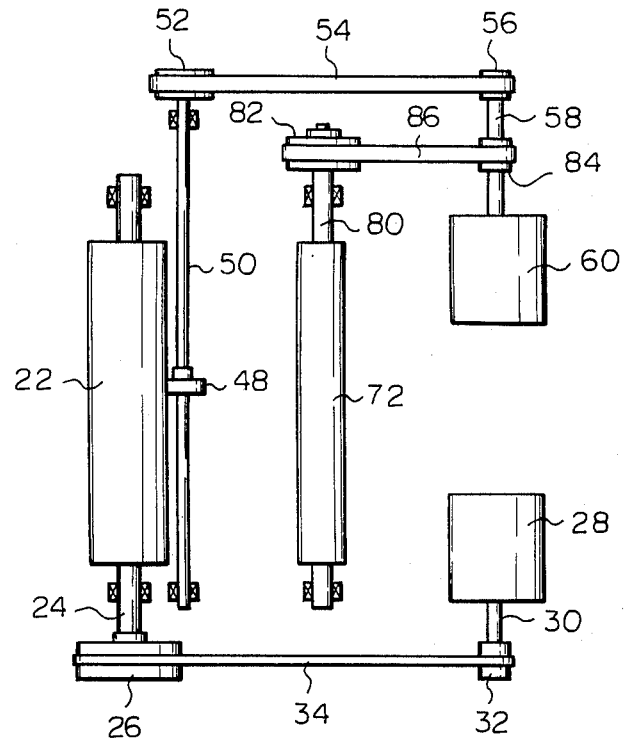
FIG. 2 is a schematic plan view of the drive mechanism shown in FIG. 1.

Referring to FIGS. 1 and 2, a thermal transfer type line recorder to which a drive mechanism in accordance with the present invention is applied is shown and generally designated by the reference numeral 10. The recorder 10 includes an ink sheet roller, generally 12, which is accommodated in the recorder with an ink sheet 14 wound in a roll around a supply spool 16. The ink sheet 14 paid out from the roller 12 is passed over a pressing roller 18. The ink sheet 14 may be of the kind carrying a layer of ink of a single color or the kind carrying sequential layers of ink of multiple colors such as yellow, magenta and cyan. In the case where the ink sheet 14 is multi-colored as mentioned, a color sensor 20 which is located between the ink sheet roller 12 and the pressing roller 18 will identify yellow, magenta and cyan, for example.

The ink sheet 14 passed over the pressing roller 18 is routed through between the roller 18 and a platen 22 to run on and along the periphery of the platen 22. As shown, the platen 22 has a shaft 24 on which a pulley 26 is rigidly mounted. A first drive motor 28 has an output shaft 30 on which a pulley 32 is rigidly mounted. The drive motor 28 is drivably connected to the platen 22 by an endless timing belt 34 which is passed at one end over the pulley 26 and at the other end over the pully 32. The drive motor 28 may be implemented by a reversible stepping motor by way of example.

A paper, or recording medium, 36 is inserted in between the pressing roller 18 and the platen 22 as illustrated in FIG. 1. Laid on the ink sheet 14, the paper 36 is wound around the platen 22 and fed toward a separating section S by way of a recording section R. Separated from the ink sheet 14 at the section S, the paper 36 is fed out of the recorder as shown in FIG. 1. Such a procedure will be described later in detail with reference to FIG. 4. Designated by the reference numeral 38 is a paper end sensor for sensing the leading end of the paper 36.

In the recording section R, a thermal head 40 is movable into and out of contact with the platen 22 holding the superposed ink sheet 14 and paper 36 between itself and the platen 22. Specifically, the thermal head 40 is rotatable about a shaft 42 and, as is well known in the art, is provided with a linear arrangement of heat generating elements (not shown) in a portion thereof which is to make contact with the ink sheet 14. A generally Z-shaped or crank-like bent plate 44 is rigidly connected at one end thereof to the underside of the head 40. The other end of the Z-shaped plate 44 is backed up by a spring 46 from below so that the plate 44 and, therefore, the thermal head 40 is constantly biased toward the platen 22. An eccentric cam 48 is rigid on a rotary shaft 50 and engageable with the Z-shaped plate 44 from above the spring-biased end of the latter. Also mounted on the rotary shaft 50 is a pully 52. A timing belt 54 is passed at one end over the pulley 52 and at the other end over a pulley 56. The pulley 56 is provided with a one-way clutch, which will be described, and mounted on an output shaft 58 of a second drive motor 60. The second drive motor 60, like the first drive motor 28, may be implemented by a reversible stepping motor.

Briefly, the principle underlying the present invention is that since the ink sheet 14 is fed in one direction only and release of the thermal head 40 from the platen 22 involves no intermediary action concerning the sequence, the second drive motor 60 can be shared by the ink sheet 14 and the thermal head 40 with the first drive motor 28 exclusively assigned to the platen 22.

Figure 3:
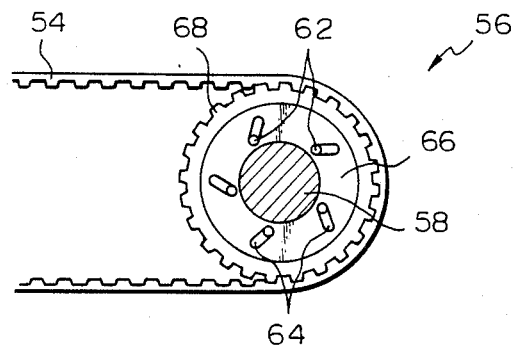
FIG. 3 is a schematic view of a pulley with a one-way clutch which is applicable to the drive mechanism of FIG. 1; and FIG. 4A

As shown in FIG. 3 the one-way clutch associated with the pulley 56 on the output shaft 58 of the second drive motor 60 may comprise a a needle clutch by way of example. In this particular example, the needle clutch is constructed to remain uncoupled responsive to clockwise rotations of the shaft 58 and become coupled responsive to counterclockwise rotations of the same. In detail, as the shaft 58 rotates clockwise, needles 62 are released along their associated radially outwardly extending slots 64 to prevent the rotation of the shaft 58 from being transmitted to a clutch section 66 which surrounds the shaft 58. Under this condition, a toothed pulley section 68 which is press-fit in the periphery of the clutch section 66 is not caused to rotate and, therefore, the timing belt 54 is not driven. Upon counterclockwise rotation of the shaft 58, on the other hand, the needles 62 bite into between the shaft 58 and the clutch section 66 to transmit rotation of the former to the latter. This causes the toothed pulley section 68 to rotate, thereby driving the timing belt 54, which in turn drives the eccentric cam 48 in a rotational motion. While the cam 48 is not engaged with the Z-shaped plate 44, the thermal head 40 is held in pressing contact with the platen 22 by the spring 46; when the cam 48 is engaged with the plate 44, the former urges the latter downwardly against the force of the spring 46 with the result that the head 40 is rotated downwardly about the shaft 42 away from the platen 22. p Meanwhile, the ink sheet 14 separated from the paper 36 at the section S is routed from a separating roller 70 to a drive roller 72 by way of a guide roller 74 and a front tension roller 76. A pressure roller 78 is adapted to press the sheet 14 against the drive roller 72. The drive roller 72 is rigidly mounted on a shaft 80 together with a pulley 82. A pulley 84 with a one-way clutch is mounted on the output shaft 58 of the second drive motor 60 and is drivably connected to the pulley 82 by an endless timing belt 86.

The pulley 84, like the previously mentioned pulley 56, may be implemented by the pulley with a needle clutch as shown in FIG. 3. However, the clutch associated with the pulley 84 is coupled responsive to rotations of the motor output shaft 58 which are opposite in direction to those responsive to which the clutch associated with the pulley 56 is coupled. Specifically, as the shaft 58 rotates clockwise, the clutch associated with the pulley 84 is coupled to drive the timing belt 86 and, thereby, the drive roller 72; during counterclockwise rotation of the shaft 58, the pulley 84 remains uncoupled so that the timing belt 85 and, therefore, the drive roller 72 is not driven.

The ink sheet 14 is routed from the drive roller 72 to a take-up spool 88 and wound therearound to form an ink sheet roller 90 on the take-up side.

Figure 4B:
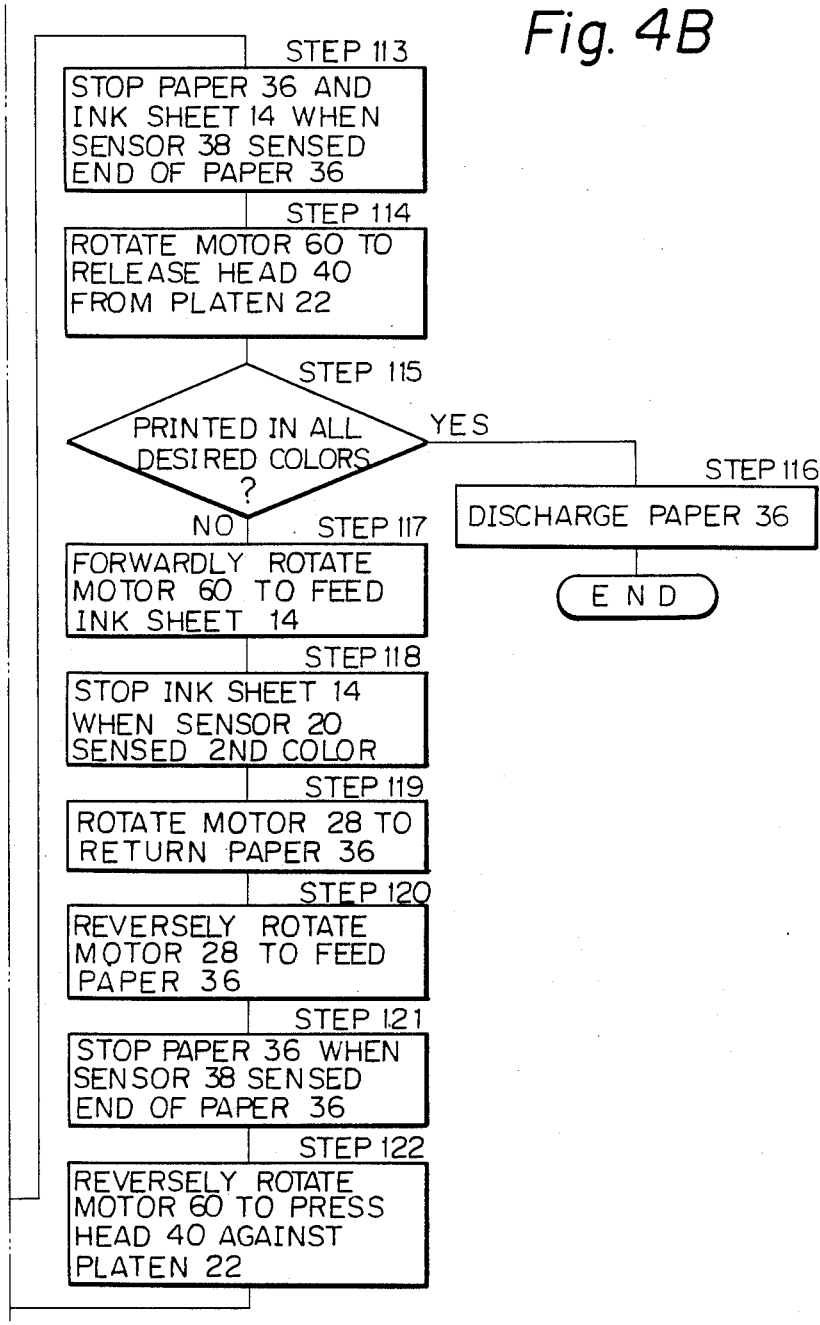
FIG. 4B is a flowchart demonstrating the operation of the recorder shown in FIG. 1.

The operation of the drive mechanism will be described with reference to FIG. 4. First, the second drive motor 60 is rotated reversely (counterclockwise in the drawing) to release the thermal head 40 from the platen 22 (STEP 101). Then, the first drive motor 28 is rotated reversely (counterclockwise in the drawing) to in turn rotate the platen 22, with the result that the paper 36 is nipped and fed by the platen 22 and pressing roller 18 (STEP 102). As the paper end sensor 38 senses the leading end of the paper 36, the movement of the paper 38 is interrupted (STEP 103). At the same time, the second motor 60 is rotated forwardly (clockwise in the drawing) to feed the ink sheet 14 (STEP 104). When the color sensor 20 has sensed the first color to print such as yellow, the feed of the ink sheet 14 is stopped (STEP 105). This is followed by another reverse rotation of the second motor 60 so that the thermal head 40 is urged against the platen 22, thereby nipping the superposed paper 36 and ink sheet 14 (STEP 106). Thereupon, the first motor 28 is rotated reversely and the second motor 60 forwardly in synchronism with the first motor 28 to feed respectively the paper 36 and the ink sheet 14 to the print start position (STEPS 107 and 108). In this condition, the thermal head 40 is energized to selectively cause its heat generating elements to generate heat and, thereby, transfer the ink on the ink sheet 14 to the paper 36 to print out one line of data (STEP 109). Next, the first and second motors 28 and 60 are energized again in synchronism with each other to feed the superposed ink sheet 14 and paper 36 by one line for starting a new line (STEP 110). This is followed by determining whether the printout procedure, STEPS 109 and 110, has to be repeated, that is, whether any other data to be printed out in the first color exists (STEP 111). If the answer is "YES", the line-by-line transfer and new line steps are repeated. As the printout operation using the first color is completed, the first and second motors 28 and 60 are continuously energized to sequentially feed the superposed ink sheet 14 and paper 36 as far as the separating section S (STEP 112). After the ink sheet 14 and the paper 36 have been separated from each other at the section S, the former is fed toward the guide roller 74 and the latter upwardly as viewed in FIG. 1. As soon as the paper end sensor 38 senses the end of the paper 36, the movement of each of the ink sheet 14 and paper 36 is interrupted (STEP 113). Thereafter, the rotating direction of the second motor 60 is reversed to release the thermal head 40 from the platen 22 (STEP 114).

Next, whether data have been printed out in all the desired colors is decided (STEP 115). Where the number of colors to print out data is single, the paper 36 is discharged to the outside of the apparatus (STEP 116) to finish the printout operation.

Meanwhile, where data are to be printed out in multiple colors as decided at the STEP 115, the second motor 60 is driven forwardly after the STEP 114 to feed the ink sheet 14 (STEP 117). As soon as the color sensor 20 senses the second color such as magenta, the feed of the ink sheet 14 is stopped (STEP 118). Then, the first motor 28 is rotated forwardly (clockwise in the drawing) to return the paper 36 by the amount of feed from the previously mentioned print start position plus a predetermined margin (STEP 119). Next, the first motor 28 is rotated reversely (STEP 120) and, when the paper end sensor 38 has sensed the leading end of the paper 36 again, any further movement of the paper 36 is inhibited (STEP 121). In this condition, the second motor 60 is rotated reversely to urge the thermal head 40 against the platen 22 again (STEP 122). This is followed by repeating the STEPS 107–114 to print out data in the second color. Such may be further repeated to print out data on the paper 36 in any desired number of colors such as cyan, black and white. After all the desired data have been printed out in all the desired colors as decided at the STEP 115, the paper 36 is discharged to the outside at the step 116.

In the illustrative embodiment, the first and second one-way clutches which respectively are associated with the pulleys 56 and 84 are mounted on the same shaft 58 and arranged to couple responsive to opposite directions of rotation of the shaft 58 to each other. Alternatively, the one-way clutches may be mounted on independent shafts to which the rotation of the second motor can be transmitted. Such would allow the two one-way clutches to share the same directional characteristic and, thereby, to have the same construction.

Further, the needle clutches which implement the one-way clutches as shown and described may be replaced with spring clutches or any other suitable clutches. The needle clutches and spring clutches exhibit fast response when used with stepping motors for step-by-step control, because their backlash during forward and reverse movements is approximately zero. Other advantages particular to those clutches is that they are small-size and economical in construction and, yet, have a considerable torque transmission capability.

In summary, it will be seen that the drive mechanism for a thermal transfer type line recording apparatus of the present invention cuts down the number of necessary motors to simplify the overall construction and lower the cost, while trimming the dimensions of the whole apparatus.

Various modifications will become possible for those skilled in the art after receiving the teachings of the present disclosure without departing from the scope thereof.

What is claimed is:

1. A thermal transfer type line recording apparatus comprising:
    (a) a platen rotatable in a first direction and in a second direction opposite to the first direction;
    (b) first means for passing a paper over said platen;
    (c) second means for superposing an ink sheet over the paper as it passes over said platen;
    (d) a thermal head mounted for movement back and forth between an inoperative position spaced from said platen and an operative position in which it presses the superposed paper and ink sheet against said platen to record a line of data on the paper by thermal transfer;
    (e) a first reversible indexing drive motor rotatable in a first direction and in a second direction opposite to the first direction, said first reversible indexing drive motor being operably connected to said platen for rotating said platen in its first direction while multiple lines of data are printed on the paper in one color and for rotating said platen in its second direction so that multiple lines of data may be printed on the paper in another color;
    (f) a second reversible indexing drive motor rotatable in a first direction and in a second direction opposite to the first direction; and
    (g) third means operably connecting said second reversible indexing drive motor both to said second means and to said thermal head so as to move said thermal head back and forth between its operative and its inoperative positions and so as to index the ink sheet relative to said platen while said thermal head is in its inoperative position.

2. A thermal transfer type line recording apparatus as recited in claim 1 wherein said third means comprise:
    (a) a first one-way clutch for transmitting rotation of said second reversible indexing drive motor in its first direction to said second means and
    (b) a second one-way clutch for transmitting rotation of said second reversible indexing drive motor in its second direction to said thermal head.

3. A thermal transfer type line recording apparatus as recited in claim 2 wherein said first and second one-way clutches are mounted on a common output shaft of said second reversible indexing drive motor.

4. A thermal transfer type line recording apparatus as recited in claim 2 wherein at least one of said first and second one-way clutches is a needle clutch.

5. A thermal transfer type line recording apparatus as recited in claim 4 wherein both of said first and second one-way clutches are needle clutches.

6. A thermal transfer type line recording apparatus as recited in claim 2 wherein at least one of said first and second one-way clutches is a spring clutch.

7. A thermal transfer type line recording apparatus as recited in claim 6 wherein both of said first and second one-way clutches are spring clutches.

8. A thermal transfer type line recording apparatus as recited in claim 1 and further comprising fourth means for sensing an end of the paper after data has been printed on the paper in one color and for causing said first reversible indexing drive motor to rotate said platen in its second direction.

9. A thermal transfer type line recording apparatus as recited in claim 1 wherein said third means comprise:
    (a) a fifth means for biasing said thermal head towards its operative positive;
    (b) a rotatary cam operably connected to said thermal head to move said thermal head to its inoperative position against the bias of said fifth means; and
    (c) sixth means operably connecting said second reversible indexing drive motor to said rotary cam to cause rotation of said rotary cam.

10. A thermal transfer type line recording apparatus as recited in claim 1 wherein said thermal head is mounted for pivotal movement between its operative and inoperative positions.

* * * * *